(12) United States Patent
DaSilva

(10) Patent No.: US 6,199,949 B1
(45) Date of Patent: Mar. 13, 2001

(54) CHILD SAFETY SEAT

(76) Inventor: Eric S. DaSilva, 830 Post Rd. East, Westport, CT (US) 06880

(*) Notice: Subject to any disclaimer, the term of this patent is extended or adjusted under 35 U.S.C. 154(b) by 0 days.

(21) Appl. No.: 09/629,921

(22) Filed: Jul. 31, 2000

(51) Int. Cl.$^7$ ................................................ B60N 2/28
(52) U.S. Cl. ................................ 297/256.12; 297/256.16
(58) Field of Search ........................... 297/250.1, 256.12, 297/256.16

(56) References Cited

U.S. PATENT DOCUMENTS

| | | | |
|---|---|---|---|
| 3,094,356 | * 6/1963 | Burke | 297/256.12 X |
| 4,762,364 | * 8/1988 | Young | 297/256.12 |
| 4,971,392 | * 11/1990 | Young | 297/256.12 |
| 5,524,964 | * 6/1996 | Weimersheimer | 297/256.12 |

* cited by examiner

Primary Examiner—Peter R. Brown

(74) Attorney, Agent, or Firm—Fattibene & Fattibene; Arthur T. Fattibene; Paul A. Fattibene

(57) ABSTRACT

A child safety seat having a child seat hingedly mounted on a seat support for use in a vehicle. The child seat includes a seat portion and a back portion with interconnecting sides, pivotally mounted on a seat support, whereby the child seat can be pivoted in either clockwise or counterclockwise direction relative to the seat support about either one of two spaced apart axes of rotation. The arrangement is such that with the seat support centrally positioned on the rear seat of a vehicle, the child seat can be pivoted at least 90° relative to the seat support so that the child seat is positioned closely adjacent to and facing the door opening of the vehicle to provide for maximum ease in placing a child in the child seat. The child seat is provided with a harness to secure the child in place therein, and a latch or locking mechanism is provided to automatically lock the child seat relative to the seat support in the operative position. A manual release is operatively connected to the locking mechanism for effecting the unlatching of the child seat relative to the seat support to permit the rotation of the child seat about one of the pivoting axes.

13 Claims, 4 Drawing Sheets

CHILD SAFETY SEAT

FIELD OF INVENTION

This invention is directed to a child safety seat for use in a moving vehicle, and more specifically to a child safety seat that pivots in either a clockwise or counterclockwise direction and is capable of being laterally displaced to a position where the safety seat is closely adjacent to and facing the door opening.

BACKGROUND OF THE INVENTION

Child vehicle safety seats in many jurisdictions are rendered compulsory by law. Generally, such child vehicle safety seats are centrally positioned in the back seat of an automobile or vehicle, as such center position is considered to be the most safe position against any frontal and/or side collision. Normally, such known safety seats are securely strapped to the rear seat, and become a fixture within the vehicle until the child has outgrown the need for such safety seat.

It has been observed that mothers and/or fathers of small children encounter considerable difficulty in lifting a baby or small child and placing such child in a centrally positioned safety seat. The process required picking up the child and leaning into the relatively cramped quarters of a rear seat of an automobile and then twisting in order to place the child in the forward facing car seat. The task becomes even more awkward and difficult with a squirming or defiant child, and especially more difficult if the child is rather large or heavy for his or her size or age. For a parent with a back problem, the difficulty of placing a small child in a car safety seat is further compounded. This is because the child must first be lifted and in a crouched or leaning position to place the child into the vehicle and then twisting one's body approximately ninety (90°) degrees in such crouched position to place the child in the safety seat. With the child properly placed in the car seat, the parent, while still in the awkward and twisted position, must then buckle the harness to secure the child in the car seat.

In an effort to alleviate the difficulty of lifting and placing a child in a car seat as described, a swivel car seat has been suggested as noted in U.S. Pat. No. 4,971,392. However, such known swivel car seats pivoted about a center axis, and even in a pivoted position, the center of such swiveling child safety seat remains centered relative to the rear seat. With such swivel seats, the parent was still required to lift the child and in a leaning position place the child in the centrally located car seat. Such activity of lifting and placing a child in a centrally positioned car seat tends to cause excessive stress on the body of the parent or person doing the lifting, and which task is aggravated for those persons having limited or impaired movement, e.g. a pregnant mother, or one having a weak back or a lumbar condition. Another known child seat is disclosed in U.S. Pat. No. 3,094,356. However, it is subject to the same deficiencies hereinabove noted. U.S. Pat. No. 5,148,559 discloses a patient conveyance device for transporting semi-ambulatory patients between bed, wheelchair, and bathroom facilities, etc.

As a result of the difficulties encountered in seating a small child in a car safety seat located centrally of the rear seat, many parents locate the child's seat as close to the door as possible rather than positioning the child seat at the centermost position. In doing so, the parent is sacrificing safety for convenience, which is undesirable.

SUMMARY OF THE INVENTION

An object of this invention is to provide a child's safety seat for use in a vehicle wherein the safety seat may be centrally positioned in a vehicle for maximum safety in the operative position and which can be rotated either in a clockwise or counterclockwise direction so that the child's seat is laterally displaced relative to its centered position to a position closely adjacent and facing the door opening of the vehicle to minimize the imposition of any stress on the body of the person placing the child in the child's seat.

Another object of this invention is to provide a child's safety seat that is rendered pivotal about either one of two parallel spaced apart axes so that the child's safety seat can be pivoted either to the left or right of its operative centered position so that a child can be placed in the safety seat with a maximum of ease from either side of the vehicle.

Another object is to provide a child's safety seat pivotable about either of two parallel spaced apart axes and which safety seat is positively latched or locked in the operative position.

Another object is to provide a child's safety seat which is relatively simple in construction and positive in operation.

The above objects and other features and advantages are attained by a child safety seat mounted on a seat support that is securely fastened in or to the vehicle. A child seat is supported on the seat support and includes a back portion, a connected seat portion and opposed sides interconnected to the seat portion and back portion to form a seat sized to receive a small child. The child seat is hingedly connected to the seat support by spaced apart hinge assemblies that include removable hinge pins so that the child seat can be rotated in either a clockwise or counterclockwise direction relative to the seat support when one of the hinge pins is removed. As the axis of rotation of the hinge assemblies are laterally spaced apart, the child seat can be pivoted either to the left or right of its dead center position so that in a rotated position the child seat is virtually opposite and facing the vehicle door so that a person need only lift the child and comfortably place the child in the child seat without twisting or other contorted motion heretofore required to position a child in a child seat centrally disposed on the rear seat of a vehicle. The child seat is provided with a harness or safety straps which can be readily fastened to secure the child in the child seat. With the child safely secured, the child seat is rotated about its axis of rotation to center the child seat on the seat support secured to the rear seat of a vehicle. The child seat is secured to the seat support by replacing the removed hinge pin. A latching mechanism is also provided to positively secure or lock the child seat in its operative and centered position on the seat support.

IN THE DRAWINGS

DETAILED DESCRIPTION

Figure 1:
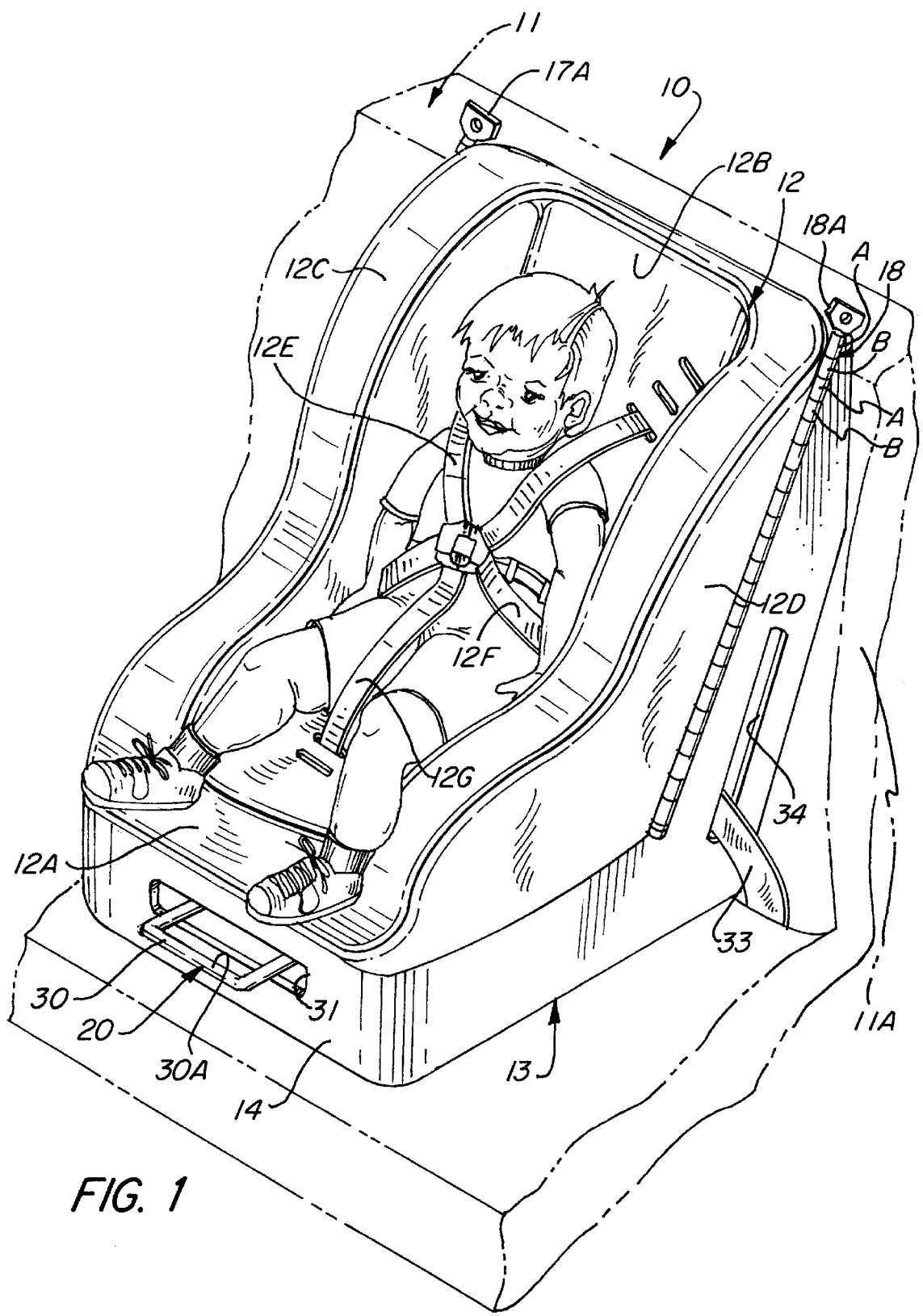
FIG. 1 is a perspective view of a child safety seat embodying the present invention.

Referring to FIG. 1, the child safety seat 10 is illustrated as being centrally located on the rear seat 11 of a vehicle, e.g. an automobile. It is preferred that child safety seat 10 be centrally positioned on the rear seat of an automobile, as it is generally understood that the central position of the rear seat provides for maximum safety in the event of a collision. It will be understood that for purposes of description, reference is made to an automobile. However, the child safety seat 10 herein described is applicable for use in any land, air, or sea vehicle.

In the illustrated embodiment, the child safety seat 10 includes a child's seat 12 having a seat portion 12A, a connected back portion 12B and opposed sides 12C and 12D, which may be padded for added protection for the child placed thereon. The child seat 12 is also provided with a harness or safety straps 12E to secure the child therein, as illustrated in FIG. 1. As shown, the safety harness includes a shoulder and lap straps 12E and 12F, which are suitably releasably buckled together with a between-the-legs strap 12G.

As shown, the child seat 12 is supported on a seat support 13. The seat support 13 includes a base portion 14 and a connected back 15. In the illustrated embodiment, the back 15 of the seat support 13 is connected to opposed rearwardly extending flanges 16—16 to space the back 15 slightly from the back portion 11A of the rear seat 11. While the seat support 13 is illustrated as a separate portable unit which is placed and secured to the rear seat 11 of a vehicle, it will be understood that the seat support may be the rear seat 11 of the vehicle that can be adapted to receive the child's seat 12 as herein described.

Figure 2:
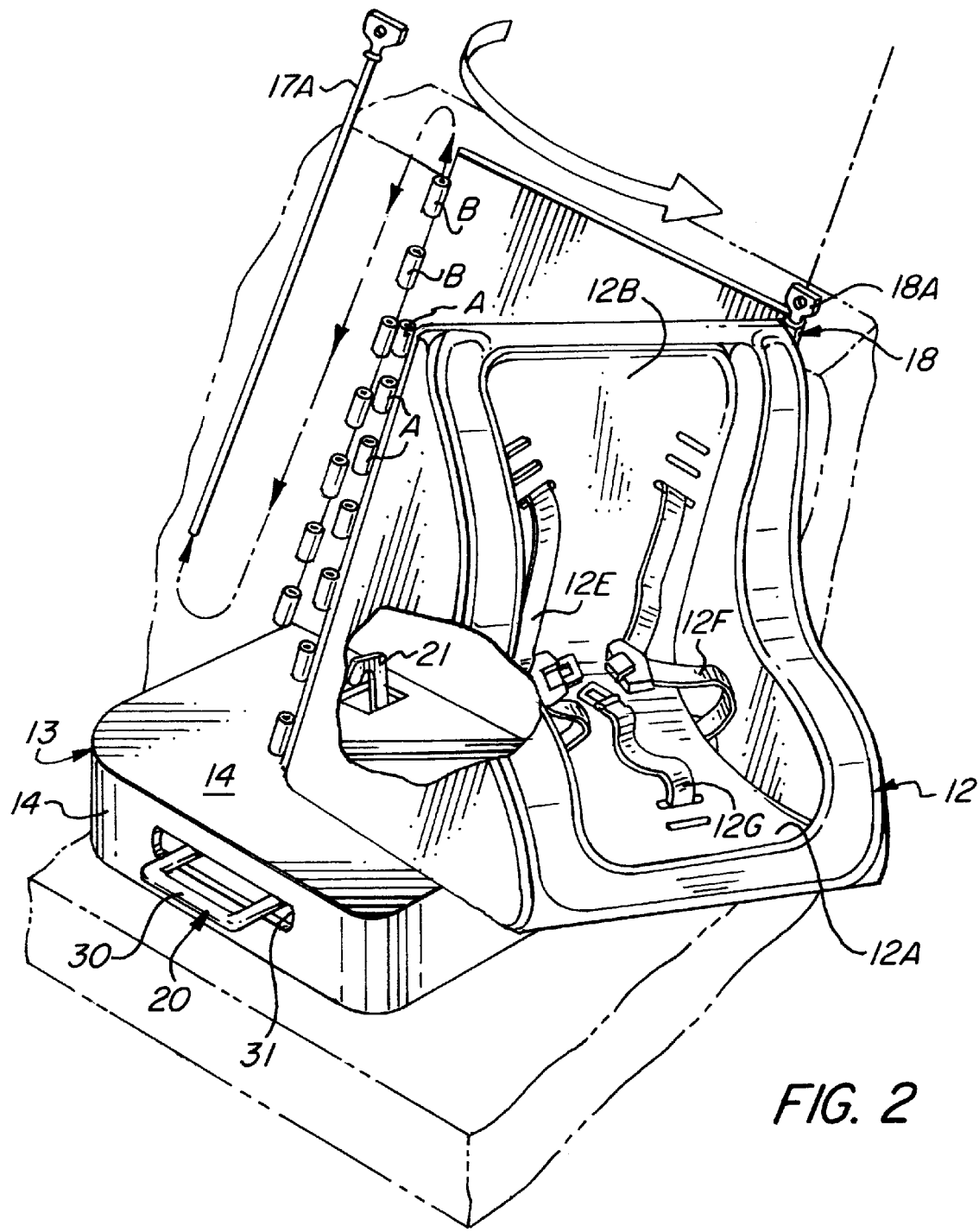
FIG. 2 is a perspective view of the child safety seat illustrating the child seat in a counterclockwise rotatable mode and having parts broken away.

In accordance with this invention, the child seat 12 is hingedly connected to the seat support 13 by laterally spaced apart hinge assemblies 17 and 18. Each of the hinge assemblies are similarly constructed. As shown, each hinge assembly 17 and 18 comprises a piano type hinge wherein a series of spaced apart hinge loops A are connected along the edge of the back portion 12B of the child seat 12 and a complementary series of hinge loops B are connected to the opposed edges of the back 15 of the seat support 13, as seen in FIG. 2. The arrangement is such that in the operative position as seen in FIG. 1, the respective hinge loops A and B are disposed in axial alignment and are secured in aligned hinging relationship by a removable hinge pin 17A, 18A, as seen in FIG. 1.

With the construction thus far described, it will be apparent that the child seat 12 is hingedly connected to rotate relative to the seat support 13 in either direction, i.e. a clockwise or counterclockwise direction, by effecting the removal of one hinge pin, either 17A or 18A, accordingly. For example, in FIG. 2, by the removal of hinge pin 17A and releasing the latching mechanism, as will be hereinafter described, the child seat 12 is free to rotate in a counterclockwise direction about the axis of hinge pin 18A. In doing so, it will be noted that the child seat 12, when rotated approximately 90°, is laterally repositioned so that the child seat 12 is virtually in the plane of the door opening and facing the door opening of the vehicle so that one can readily place a child directly into the child seat 12 without having to lean over halfway into the vehicle and then twisting to place the child into the seat, as heretofore required with known child car seats.

Figure 3:
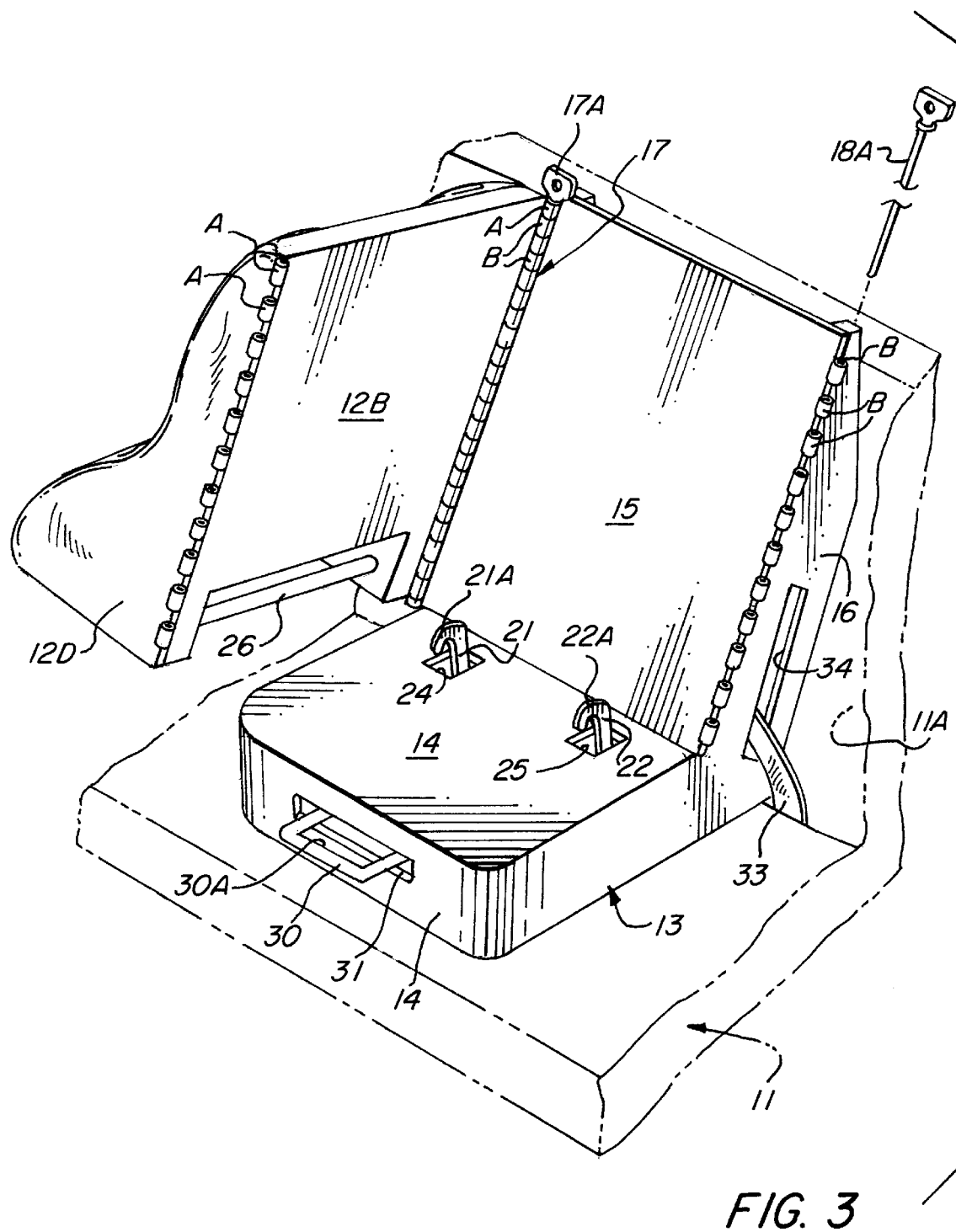
FIG. 3 is a perspective view of the child safety seat illustrating the child seat in a clockwise rotatable mode.

FIG. 3 illustrates the rotation for the child seat 12 in the opposite or clockwise direction by the removal of hinge pin 18A. Thus, the child safety seat herein described permits one to place the child into the child seat 12 from either side of a car with equal ease and also with greater safety, as the child can always be placed into the vehicle through the vehicle door adjacent the curbside.

With the child securely strapped in the child seat 12 by the harness 12E, F and G, the child seat 12 is rotated back to its centered position on the seat support 13 and is automatically latched or locked thereon so as to prohibit any unintentional rotation of the child safety seat 12 relative to the seat support 13. This is attained by a latching or locking mechanism 20.

Figure 4:
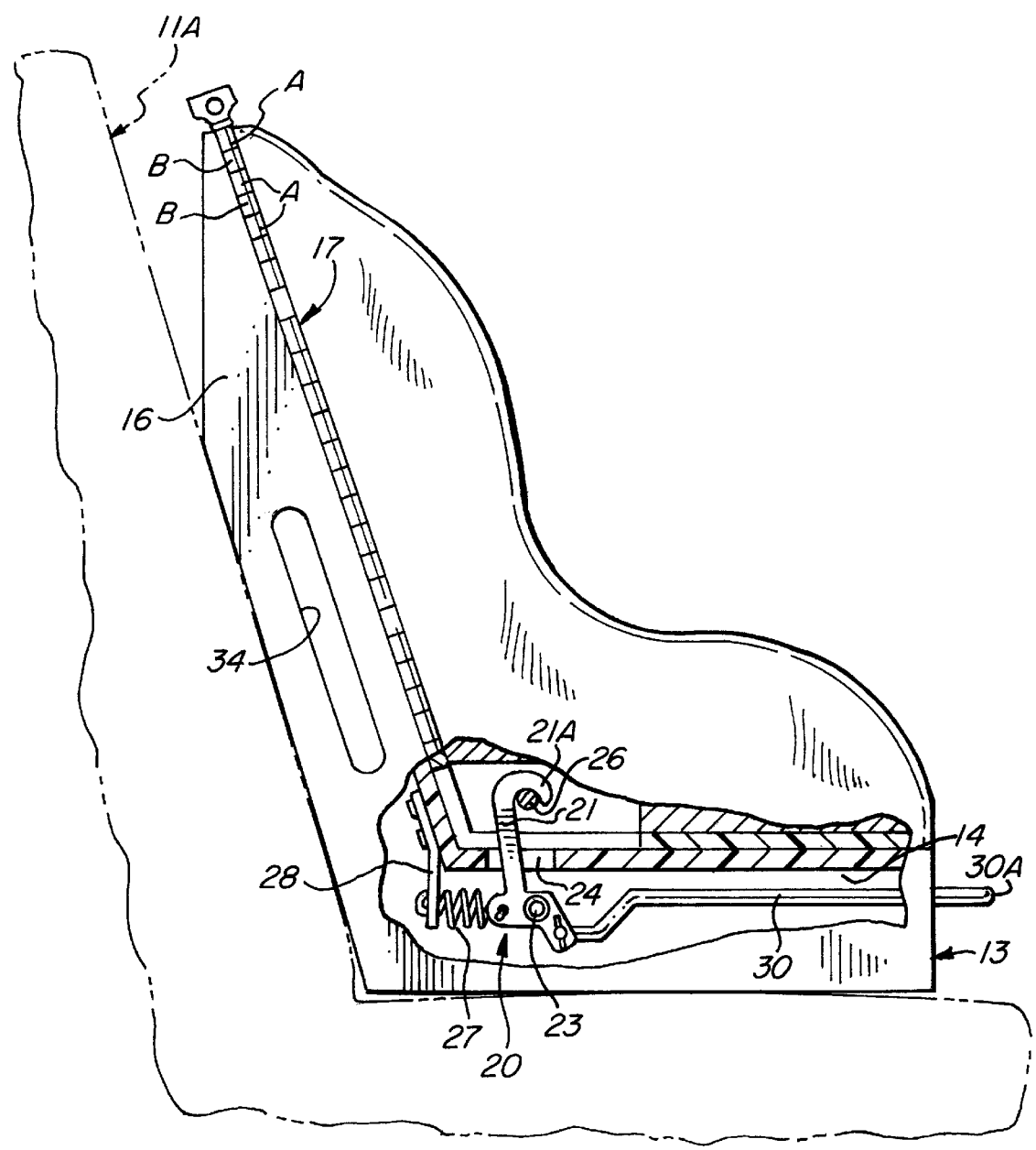
FIG. 4 is a side view of the child safety seat shown partly in section to illustrate the latching mechanism.

Referring to FIGS. 3 and 4, the locking or latching mechanism includes a pair of spaced apart latches 21, 22 pivotally mounted about pivot rod or pin 23 connected to the underside of the base portion 14 of the seat support 13. The respective latches 21, 22 project upwardly through opening 24, 25 formed in the base portion 14. The upper ends of the respective latches are provided or shaped with a hook end 21A, 22A, which are arranged to engage with a catch bar 26 extending between the opposed sides of the child seat 12, as best seen in FIGS. 3 and 4. A spring 27 having one end anchored to a bracket 28 connected to the base 14 of the seat support 13 and the other end connected to its corresponding latch functions to normally bias the corresponding latch hooks 21, 22 toward the operative or locking position to secure the child seat 12 in its centered position on the seat support 13.

To release the latches 21, 22 to permit rotation of the child seat 12 relative to the seat support 13, a latch release mechanism is provided. As illustrated in FIGS. 3 and 4, the release mechanism includes a generally U shaped pull rod 30, the free ends of which are anchored or connected to a corresponding latch hook 21, 22 as seen in FIG. 4. The opposite end of the pull rod 30 extends through an opening 31 formed in the front end of the base portion 14 and defines a handle 30A to facilitate the release of the locking latches 21, 22, when pulled. The spring 27 acting on each of the lock latches 21, 22 will automatically return the locking latches 21, 22 to their normal locking position when the force acting on the pull rod 30 is released. The arrangement is such that the locking latches 21, 22 will automatically engage the catch bar 26 to lock the child seat 12 as the child seat 10 is returned to its centered position on the seat support 13.

In operation, the seat support 13 with or without the child seat 12 thereon is placed centrally on the rear seat 11 of a vehicle and is secured to the rear seat 11 by means of the safety straps 33 normally found in the vehicle. The vehicle safety straps 33 is inserted through slots 34 formed in the seat support 13 and buckled to secure the seat support 13 thereon. If the seat support 13 is installed without the child seat 12, the child seat 12 is then positioned on the seat support 13 and fixed thereto by inserting the hinge pins 17A, 18A through the aligned associated hinge loops A and B.

To place a child in the child safety seat 10, the handle 30A of the pull rod 30 is pulled to release the locking latches 21, 22 to unlock the child seat 12 from the seat support 13. Depending on the desired rotation of the child seat 12, one of the hinge pins 17 or 18 is removed so that the seat 12 may be pivoted about the axis of the unremoved hinge pin. In the pivoted position, the child safety seat 12 is rotated to a position closely adjacent to and facing the vehicle door opening. In this position, the child can be easily lifted and placed in the child safety seat 12 with a maximum of ease and a minimum of stress on the person seating the child. With the child comfortably seated in the safety seat, the child can be readily buckled in the harness 12E, F and G provided. Upon securing the child in his harness, the safety seat 12 with the child in place is rotated to its centering position on the seat support 13, and the removed hinge pin reinserted into its now aligned hinge loops A and B. In rotating the seat 12 with child to the centering position on the seat support, the latching hooks are automatically actuated to effect the locking of the seat 12 to the seat support 13.

While the child seat 12 has been described for use in conjunction with a seat support 13, it will be understood that the vehicle manufacturer may build the described seat support as an integral part of the rear seat 11. In such an event, the child seat 12 may be hingedly connected directly to the back 11A of the rear seat 11 of the vehicle by having loops B being incorporated as an integral part of the rear seat. Also, the latching mechanism 20 as herein described may be incorporated into the rear seat of a vehicle.

From the foregoing, it will be apparent that the original vehicle manufacturer may incorporate the seat support structure described as an integral part of the rear seat. For after-market application, a seat support 13 will be required as herein described.

While the present invention has been described with respect to a particular embodiment, modifications and variations may be made without departing from the spirit or scope of this invention.

What is claimed is:

1. A child safety seat comprising:
   a seat support,
   a child's seat,
   a pair of spaced apart hinge assemblies for securing said child's seat to said seat support, and
   each of said hinge assemblies including a removable hinge pin whereby said child's seat is rendered pivotally mounted relative to said seat support upon the removal of one of said removable hinge pins about an axis of rotation defined by the unremoved hinge pin.

2. The child's safety seat as defined in claim 1 and including a latching assembly for locking said child's seat relative to said seat support in the operative position of said child's seat.

3. A child's safety seat as defined in claim 2 and including a harness for securing a child in said safety seat.

4. A child's safety seat as defined in claim 2 wherein said latching assembly includes a latching hook pivotally connected to said seat support,
   said seat support including a base portion having an opening therein,
   said latching hook extending through said opening,
   said child's seat including a seat portion,
   a bar catch connected to the underside of said seat portion disposed so as to be in interlocking relationship with said latching hook in the operative position,
   and a release mechanism operatively connected to said latching hook to effect the unlocking of said latching hook relative to said bar catch.

5. A child's safety seat as defined in claim 4 and including a spring operatively connected to said latching hook for normally biasing said latching hook toward a locking position.

6. A child's safety seat as defined in claim 4 wherein said release mechanism includes a pull rod which extends forwardly of said seat support whereby the extended end of said pull rod defines a handle.

7. A child's safety seat as defined in claim 1 wherein each of said hinge assemblies includes a series of spaced apart hinge loops connected to said seat support and said child's seat, whereby said hinge loops connected to said seat support are disposed in axial alignment with said hinge loops connected to said child's seat in the operative position, and said removable hinge pin extending through said aligned hinge loops in each of said hinge assemblies.

8. A child safety seat as defined in claim 1 wherein said seat support comprises an integral part of a vehicle.

9. A child's safety seat for use in a moving vehicle comprising:
   a seat support having a base portion and a connected back,
   a child's seat having a seat portion, a back portion and opposed sides interconnected with said seat portion and back portion,
   means for pivotally connecting said child's seat relative to said seat support,
   said means including a pair of spaced apart hinges,
   each of said hinges including a first series of spaced apart hinge loops connected along the opposed edges of said back portion of said child's seat, and
   a complementary series of spaced apart hinge loops connected to said back of said seat support whereby said complementary series of hinge loops are disposed in axial alignment with said first series of loops in the operative position of said child's seat,
   a removable hinge pin disposed in said first series of hinge loops disposed in alignment with said complementary series of hinge loops,
   and a latching mechanism for locking said child's seat relative to said seat support.

10. A child's safety seat as defined in claim 9 wherein said seat support and child seat are rendered readily portable.

11. A child's safety seat for use in a vehicle comprising:
    a seat support including a base and a connected back,
    means for securing said seat support to an interior portion of a vehicle,
    a child seat having a seat portion, a connected back portion and opposed sides interconnected to said seat portion and back portion,
    said back portion having opposed edges,
    a pair of spaced apart hinges connecting said back portion of said child's seat to said back of said seat support whereby the axis of rotation of each of said hinges is substantially coincidental to said opposed edges of said back portion,
    a removable hinge pin defining the axis of rotation of each of said hinges, whereby the removable hinge pin permits said child's seat to be rotated relative to said seat support about an axis of rotation defined by the unremoved hinge pin and a locking latch assembly for locking said child's seat to said seat support in the operative position.

12. A child's safety seat as defined in claim 11 wherein said locking latch assembly includes:
    a pair of spaced apart latch hooks pivotally connected to said seat support,
    said pair of latching hooks extending through said base,
    a spring means biasing each of said latch hooks toward its respective latching position,
    a bar catch extending transversely on the underside of said seat portion,
    said bar catch being disposed so as to be in interlocking relationship with said latching hooks in the operative position of said car seat,
    a latch release connected to said latching hook,
    said latch release extending forwardly of said base of said seat support whereby the extended portion of said latch release defines a handle by which said latch release may be actuated.

13. A child's safety seat as defined in claim 12 and including a harness associated with said child's seat for securing a child in said child's seat.

* * * * *